2,882,197

SULFURIZED ALKYL THIOFORMAL FUNGICIDAL COMPOSITIONS

Irving D. Webb, Yorba Linda, Carleton B. Scott, Pomona, and John W. Yale, Yorba Linda, Calif., assignors, by mesne assignments, to Collier Carbon and Chemical Corporation, a corporation of California No Drawing. Application December 3, 1956
Serial No. 625,592

13 Claims. (Cl. 167—22)

This invention relates to fungicidal compositions, and in particular concerns fungicidal compositions comprising certain sulfurized alkyl thioformals as the essential active ingredient.

The alkyl thioformals are organic compounds having the general formula:

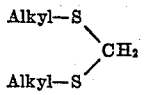

and are prepared by reacting alkyl mercaptans with formaldehyde in the presence of an acidic catalyst, or by reacting alkyl mercaptans with a methylene halide in the presence of an alkaline reagent.

The present invention is based on our discovery that while methyl and ethyl thioformals are substantially inactive as fungicides, the products obtained by reacting these compounds with elemental sulfur display unusual fungicidal activity which is far greater than the sum of the activities of elemental sulfur and the thioformals themselves. The invention thus relates to fungicidal compositions comprising one or a mixture of reaction products of methyl or ethyl thioformal and elemental sulfur as the essential active ingredient.

The reaction between methyl or ethyl thioformal and elemental sulfur to form the present fungicidally active reaction products takes place readily upon heating a mixture of the two reactants at such temperature and for such a period of time that the sulfur becomes chemically bound to the thioformal and does not separate therefrom when the mixture is cooled. If a mixture of free sulfur and methyl or ethyl thioformal is gradually heated it will be observed that at a relatively low temperature, e.g., 80° C., the sulfur dissolves and the mixture becomes a single liquid phase. If the heating is stopped at this point and the mixture is allowed to cool to about 20° C., the free sulfur precipitates, thus indicating that mere physical solution rather than chemical reaction has occurred. However, if the heating is continued and the temperature is allowed to increase to about 150° C. and maintained there for a suitable period of time, the liquid will not deposit free sulfur upon subsequent cooling even to temperatures as low as —40° C., thereby indicating that true chemical reaction has occurred. Accordingly, in preparing the present fungicidal products it is necessary that the two reactants be heated at such temperature and for such period of time that upon subsequent cooling to atmospheric temperature substantially no free sulfur is deposited from the liquid reaction product. However, the temperature should not be so high and/or the reaction time so long that any substantial degree of decomposition takes place, as is indicated by the reaction mixture losing weight. The operable temperature range varies somewhat with the amount of sulfur sought to be combined with the thioformal, but is usually at least about 100° C., and is preferably not greater than about 200° C. The time required for completion of the reaction likewise depends upon the proportions in which the two reactants are employed as well as upon the reaction temperature. Ordinarily, however, such time is between about 1 and about 5 hours, and as a general rule it will be found that heating at a temperature between about 120° C. and about 150° C. for a period of time between about 1 and about 4 hours will lead to optimum results. As is disclosed in the copending application of Irving D. Webb, Serial No. 735,995, filed May 19, 1958, the reaction temperature may be lowered and/or the reaction time may be shortened by effecting the reaction in the presence of a small amount of a Lewis acid, e.g., zinc chloride.

The proportion in which sulfur combines with methyl or ethyl thioformals to form the fungicidal agents of the invention varies from about 1 to about 15 atoms of sulfur per molecule of the thioformal. Accordingly, in preparing such products, between about 1 and about 15 gram atoms of sulfur may be provided per gram mole of the thioformal. The physical and biological properties of the product vary somewhat with the amount of sulfur contained therein, and insofar as fungicidal activity and ease of formulating into simple fungicidal composition are concerned it is preferred to employ the products prepared by combining from about 1 to about 6 atoms of sulfur with 1 mole of methyl or ethyl thioformal.

Procedurewise, the reaction is carried out simply by charging the desired amounts of the two reactants to a suitable reaction vessel and heating the mixture under the conditions previously described. In the interests of minimizing decomposition the heating may be effected under super atmospheric pressure, but ordinarily it is preferred to operate at atmospheric pressure and to avoid decomposition by maintaining a suitably low reaction temperature. Also, if desired, the reaction may be carried out in the presence of an inert liquid reaction medium, e. g., benzene, toluene, carbon disulfide, etc., which can subsequently either be removed from the finished product by distillation or allowed to remain therewith to serve as a dispersing aid. Ordinarily, however, we prefer to dispense with the use of reaction media, and to effect the reaction by heating a simple mixture of the two reactants. Upon completion of the reaction, the product is cooled and can be used directly without purification in formulating the present fungicidal compositions.

The following examples will illustrate the preparation of several of the present class of fungicidal agents, but are not to be construed as limiting the invention. All proportions are given in parts by weight.

Example I

Methyl thioformal is prepared by gradually adding about 100 parts of concentrated hydrochloric acid to a cooled and stirred mixture of 192 parts of methyl mercaptan dissolved in 60 grams of 37 percent aqueous formaldehyde. The organic layer of the reaction product is washed with water, dried over potassium carbonate, and distilled to obtain substantially pure dimethyl thioformal as a liquid boiling at 149°–150° C. under atmospheric pressure.

Two hundred and sixteen parts of the dimethyl thioformal so prepared, 256 parts of elemental sulfur, and 1 part of zinc chloride are heated at 145°–150° C. for 2 hours at atmospheric pressure, whereby there is obtained an orange-red liquid product from which a small amount of free sulfur is precipitated by cooling to about 0° F. After filtering off said sulfur, the product is obtained in the form of an orange-red liquid which is soluble in benzene and acetone and whose analysis corresponds to the formula $(CH_3S)_2CH_2 \cdot S_4$. It has a density of about 1.400 and an index of refraction above about 1.70, both determined at 25° C.

Example II

The following table summarizes the preparation of a number of dimethyl thioformal polysulfides of the present class. In all cases the reaction product was purified by filtering and gas-stripping with nitrogen at 1 mm. pressure and atmospheric temperature.

| DMTF [1] Parts | Sulfur, Parts | ZnCl$_2$, Parts | Reaction Temp., °C. | Reaction Time, Hrs. | Product | Appearance |
|---|---|---|---|---|---|---|
| 54 | 16 | 0.7 | 110–150 | 1 | DMTF·S$_1$ | Dk. brn. liq. |
| 54 | 48 | 1.0 | 115–148 | 0.75 | DMTF·S$_3$ | Dk. brn. liq. |
| 54 | 80 | 1.3 | 114–149 | 0.75 | DMTF·S$_5$ | Dk. yel. liq. |
| 54 | 112 | 1.7 | 119–151 | 0.67 | DMTF·S$_7$ | Orange liq. |
| 54 | 144 | 2.0 | 106–150 | 0.75 | DMTF·S$_9$ | Dk. orange liq. |
| 27 | 88 | 1.1 | 85–149 | 1 | DMTF·S$_{11}$ | Lt. brn. liq. |
| 27 | 104 | 1.3 | 103–149 | 1 | DMTF·S$_{13}$ | Dk. yellow liq. |

[1] Dimethyl thioformal.

Example III

Diethyl thioformal is obtained as a liquid boiling at 83°–87° C. under 50 mm. pressure by passing dry hydrogen chloride into a cooled mixture of ethyl mercaptan and formaldehyde at such a rate that the reaction temperature does not exceed 40° C. Sixty-eight parts of the diethyl thioformal so prepared are admixed with 32 parts of sulfur and 1 part of zinc chloride, and the mixture is heated at 114°–150° C. for 0.5 hour. The reaction product is then gas-stripped with nitrogen at 1 mm. pressure and atmospheric temperature to obtain a dark-brown liquid product whose analysis corresponds to the formula $(C_2H_5S)_2CH_2 \cdot S_2$.

Example IV

Dimethyl thioformal disulfide is prepared by heating a mixture of 54 parts of dimethyl thioformal and 32 parts of sulfur in a rocking autoclave at 200° C. for 5 hours, and thereafter gas-stripping the reaction product with nitrogen.

The fungicidal and bactericidal compositions of the present invention are prepared by combining one or a mixture of the sulfurized thioformals of the present class with a liquid or solid carrier in the conventional manner. Thus, one or a mixture of such products may be dispersed in water with the aid of a dispersing agent to form a concentrate composition which is subsequently diluted with water to form a spray suitable for application to living plants, lumber and other materials subject to fungus or bacteria attack. Alternatively, the products may be admixed with an inert solid diluent such as talc, diatomaceous earth, aluminum silicate, etc. to form dry compositions which can be employed as such in the form of dusts or which can be dispersed in an aqueous or oleaginous medium to form a liquid spray. In general, any of the conventional formulation and application techniques may be followed in employing the present fungicidal and bactericidal products, and any of the various known wetting agents, spreaders, sticking agents, diluents, etc. may be employed in combination with such products. The latter are substantially non-phytotoxic and may be applied to living plants in relatively high concentrations. However, as will be apparent from the test data presented below, they are effective in very small quantities, and in the interests of economy they are usually applied at concentrations of the order of 50–4000 parts per million. Liquid concentrate compositions usually contain between about 1 and about 15 percent of the active ingredients and sufficient of an emulsifying or dispersing agent to maintain the active ingredient uniformly dispersd in the liquid suspending medium. Solid concentrate compositions usually contain between about 5 and about 50 percent by weight of the active ingredients and, optionally, small amounts of spreading agents, dispersing agents, and other conventional adjuvants.

The following examples will illustrate the formulation of a number of fungicidal and bactericidal compositions within the scope of the invention, but are not to be construed as limiting the same.

Example V

| | Lbs. |
|---|---|
| Dimethyl thioformal mono-sulfide | 2.0 |
| Attapulgus clay | 2.5 |
| Aluminum silicate | 40.0 |
| Powdered blood albumen | 0.2 |

The ingredients are thoroughly admixed in a ball mill to obtain a fungicidal dusting composition.

Example VI

| | Lbs. |
|---|---|
| Mixed sulfurized dimethyl thioformals averaging $(CH_3S)_2CH_2 \cdot S_7$ | 2.5 |
| Water | 50.0 |
| Powdered blood albumen | 0.25 |

The dimethyl thioformal heptasulfide and blood albumen are added to the water, and the mixture is then passed through a colloid mill or high speed blender to obtain a concentrate composition which can be diluted 1000:1 to obtain a fungicidal spray.

Example VII

| | Lbs. |
|---|---|
| Diethyl thioformal monosulfide | 0.5 |
| Benzene | 5.0 |
| Non-phytotoxic spray oil | 4000.0 |

This composition is suitable as a tree spray.

Example VIII

| | Lbs. |
|---|---|
| Diethyl thioformal disulfide | 10.0 |
| Kerosene extract oil | 150.0 |

This compositon is suitable for impregnating lumber.

Example IX

| | Lbs. |
|---|---|
| Diethyl thioformal hexa-sulfide | 2.5 |
| Water | 50.0 |
| Commercial sticking agent | 0.5 |
| Commercial spreading agent | 0.5 |

The ingredients are mixed in a colloid mill and are thereafter diluted with 1200 gallons of water to obtain a spray composition containing about 250 parts per million of the active ingredient.

Example X

| | Lbs. |
|---|---|
| Dimethyl thioformal dodeca-sulfide | 0.5 |
| Non-ionic dispersing agent (Tween 80) | 0.2 |
| Water | 500.0 |

This composition is suitable for use as a bactericide.

Example XI

| | Lbs. |
|---|---|
| Mixed dimethyl thioformal sulfides averaging $(CH_3S)_2SH_2 \cdot S_4$ | 1.0 |
| Diethyl thioformal penta-sulfide | 1.0 |
| Walnut shell flour | 40.0 |
| Petroleum sulfonates | 0.3 |

The ingredients are thoroughly admixed in a ball mill to obtain a dry concentrate composition which can subsequently be diluted with water to form a spray.

In order to demonstrate the fungicidal activity of the present products, the following procedure is employed: The material to be tested is formulated into a wettable powder by grinding together and intimately admixing the following ingredients:

| | Percent by wt. |
|---|---|
| Test material | 10.0 |
| Attapulgus clay | 30.0 |
| "Neoterge" wetting agent | 0.12 |
| "Dupanol ME" wetting agent | 0.05 |
| Lignin sulfate suspending agent | 0.12 |

A 10-gram sample of the composition is added to enough distilled water to make 100 grams, and the solution is homogenized for three minutes in a high-speed blender. With the blender still operating, 3 grams of the liquid are removed therefrom and stirred into 75 grams of liquid potato dextrose agar at 45° C. and the agar is transferred to a Petri-dish. The agar so prepared contains 1000 p.p.m. of the material to be tested. If lower concentrations are to be tested, e.g., 10 or 100 p.p.m., 1-gram portions of the concentrate composition in the blender are diluted accordingly. The agar is allowed to cool, whereupon it solidifies, and a ¼" disc of the test fungus inoculum is placed on the surface of the agar. The inoculated agar is incubated for two days, after which the extent of the fungus growth is measured, and the extent of inhibition of fungus growth is calculated as follows:

$$\text{Percent inhibition} = 100 - \frac{\text{Growth on test sample}}{\text{Growth on blank}} \times 100$$

The following tabulation presents inhibition values obtained by subjecting several of the present products to the foregoing test procedure employing a variety of test organisms. All tests were carried out with an active ingredient concentration of 100 p.p.m. The abbreviation "DMTF" and "DETF" are employed to designate dimethyl thioformal and diethyl thioformal, respectively.

| Product Tested | Percent Inhibition | | | | | | |
|---|---|---|---|---|---|---|---|
| | R. solani | F. roseum | P. ultimum | S. sclerotiorum | B. cinerea | A. solani | Average for All Organisms |
| DMTF | 69.3 | 63.7 | 64.5 | 74.0 | 68.8 | 71.4 | 68.6 |
| DMTF·S$_1$ | 100 | 100 | 100 | 100 | 100 | 100 | 100 |
| DMTF·S$_2$ | 100 | 100 | 100 | 100 | 95.7 | 100 | 99.3 |
| DMTF·S$_{2.4}$ | 100 | 100 | 100 | 100 | 100 | 100 | 100 |
| DMTF·S$_3$ | 100 | 100 | 100 | 100 | 100 | 100 | 100 |
| DMTF·S$_7$ | 71.0 | 66.7 | 94.1 | 100 | 93.1 | 95.2 | 86.2 |
| DMTF·S$_9$ | 85.5 | 66.7 | 94.1 | 100 | 95.3 | 100 | 90.3 |
| DMTF·S$_{10}$ | 83.7 | 66.7 | 100 | 100 | 72.7 | | 80.6 |
| DMTF·S$_{11}$ | 93.8 | | 94.1 | 100 | 84.1 | 76.2 | 89.6 |
| DMTF·S$_{13}$ | 95.7 | | 100 | 100 | 85.7 | 71.4 | 90.5 |
| DETF | 13.7 | 0.0 | 0.0 | 27.5 | 14.0 | 21.5 | 12.8 |
| DETF·S$_2$ | 92.5 | 44.5 | 66.5 | 100 | 95.3 | 100 | 83.2 |
| DETF·S$_4$ | 100 | | 58.0 | 100 | 79.1 | 75.0 | 82.4 |
| Sulfur | | | | | | | 6.0 |
| Captan [1] | | | | | | | 74.0 |
| Phygon [1] | | | | | | | 59.0 |

[1] Commercial fungicides.

It will be apparent from the above data that the sulfurized thioformals of the present class surpass two of the widely employed commercial fungicides, and that their effectiveness is greater than that of either of the two materials from which they are prepared.

In testing the present products for bacterial action, the concentrate composition is added to a standard culture medium consisting of potato dextrose agar, yeast extract, peptone, and calcium carbonate, and the medium is inoculated with the test organism. After incubation for two days the medium is examined for bacterial growth. The following table presents the results of such tests carried out with several members of the present class of polysulfides at a concentration of 100 p.p.m.

| Product Tested | Percent Control | | | |
|---|---|---|---|---|
| | Erwinia corotovara | Pseudomonas syringae | Agrobacterium tumefaciens | Xanthamomas juglandis |
| DMTF | 0 | 0 | 0 | 0 |
| DMTF·S$_1$ | 100 | 100 | 100 | 100 |
| DMTF·S$_2$ | 100 | 100 | 100 | 100 |
| DMTF·S$_3$ | 100 | 100 | 100 | 100 |
| DMTF·S$_5$ | 100 | 100 | 100 | 100 |
| DMTF·S$_{13}$ | 100 | 100 | 100 | 100 |

The effectiveness of the present class of parasiticides in controlling various fungus diseases on living plants is demonstrated by the following data obtained by standard greenhouse testing procedures:

| Product Tested | Control | | | |
|---|---|---|---|---|
| | Septoria on Tomato Plants [1] | Alternaria on Tomato Plants [2] | Rhizoctonia on Cotton Plants,[3] percent | Pythium on Pea Plants,[3] percent |
| DMTF | Poor | Poor | 0 | 0 |
| DMTF·S$_2$ | Good | Fair | 61 | 100 |
| DMTF·S$_{2.4}$ | | | 85 | 100 |
| DMTF·S$_4$ | Good | Good | 100 | 100 |

[1] Active ingredient tested at 2,500 p.p.m.
[2] Active ingredient tested at 2,000 p.p.m.
[3] Active ingredient tested at 200 p.p.m.

In addition to their fungicidal and bactericidal properties, the present compositions are indicated to be effective in controlling nematodes. When injected directly into the soil to provide a concentration of 200 p.p.m. a mixture of sulfurized dimethyl thioformals containing an average of 2.4 added sulfur atoms per molecule gave good control of root knot nematodes on tomato plants. Dimethyl thioformal itself gave poor control.

Other modes of applying the principle of our invention may be employed instead of those explained, change being made as regards the methods or materials employed provided the product or steps stated by any of the following claims, or the equivalent of such stated product or steps, be obtained or employed.

We, therefore, particularly point out and distinctly claim as out invention:

1. A fungicidal, bactericidal and nematocidal composition comprising an inert pesticidal carrier material and, as the essential active ingredient, a sulfurized alkyl thioformal product obtained by heating a mixture comprising elemental sulfur and an alkyl thioformal selected from the class consisting of dimethyl thioformal and diethyl thioformal at a temperature between about 85° C. and about 200° C. for a period of time between about 0.67 and about 5 hours, said mixture containing between about 1 and 15 atomic weights of elemental sulfur per molecular weight of said alkyl thioformal and said sulfurized product containing between 1 and about 15 atoms of chemically bound sulfur per molecule of said alkyl thioformal.

2. A composition as defined in claim 1 wherein the said active ingredient is obtained by heating said mixture at a temperature between about 120° C. and about 150° C. for from about 1 to about 4 hours.

3. A composition as defined by claim 1 wherein the said sulfurized alkyl thioformal contains from about 1 to about 6 atoms of sulfur per molecule.

4. A composition as defined by claim 1 wherein the said alkyl thioformal is methyl thioformal.

5. A composition as defined by claim 1 wherein the said alkyl thioformal is ethyl thioformal.

6. A composition as defined by claim 1 wherein the said carrier material comprises water and sufficient of a dispersing agent to maintain the said active ingredient dispersed in said water.

7. A composition as defined by claim 1 containing between about 100 and about 4000 parts per million of said active ingredient.

8. A fungicidal, bactericidal and nematocidal composition comprising water having dispersed therein between about 100 and about 4000 parts per million of a sulfurized alkyl thioformal obtained by heating a mixture comprising elemental sulfur and an alkyl thioformal selected from the class consisting of methyl thioformal and ethyl thioformal at a temperature between about 100° C. and about 200° C. for a period of time between about 1 and about 5 hours, said mixture comprising between about 1 and about 6 atomic weights of said sulfur per molecular weight of said alkyl thioformal, said sulfurized alkyl thioformal containing between about 1 and about 6 atoms of chemically bound sulfur per molecule of said alkyl thioformal, and said sulfurized alkyl thioformal constituting the essential fungitoxic, bacteritoxic and nematotoxic ingredient of said composition.

9. The method of controlling the growth of fungi, bacteria and nematodes on plants which comprises supplying thereto a fungicidal, bactericidal and nematocidal amount of a composition defined by claim 1.

10. The method of controlling the growth of fungi, bacteria and nematodes on plants which comprises supplying thereto a fungicidal, bactericidal and nematocidal amount of a composition defined by claim 4.

11. The method of controlling the growth of fungi, bacteria and nematodes on plants which comprises supplying thereto a fungicidal, bactericidal and nematocidal amount of a composition defined by claim 5.

12. The method of controlling the growth of fungi, bacteria and nematodes on plants which comprises supplying thereto a fungicidal, bactericidal and nematocidal amount of a composition defined by claim 6.

13. The method of controlling the growth of fungi, bacteria and nematodes on plants which comprises supplying thereto a fungicidal, bactericidal and nematocidal amount of a composition defined by claim 8.

References Cited in the file of this patent

UNITED STATES PATENTS 2,510,893     Kleiman _____ June 6, 1950